(12) United States Patent
Hamada et al.

(10) Patent No.: US 6,762,892 B2
(45) Date of Patent: Jul. 13, 2004

(54) MAGNETIC TRANSFERRING METHOD AND MAGNETIC TRANSFERRING APPARATUS

(75) Inventors: Taizou Hamada, Osaka (JP); Hideyuki Hashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 413 days.

(21) Appl. No.: 09/994,676

(22) Filed: Nov. 28, 2001

(65) Prior Publication Data

US 2002/0063981 A1 May 30, 2002

(30) Foreign Application Priority Data

Nov. 28, 2000 (JP) .................................. P2000-361176
Nov. 5, 2001 (JP) .................................. P2001-339226

(51) Int. Cl.$^7$ .................................................. G11B 5/86
(52) U.S. Cl. .............................. 360/17; 360/16; 360/15
(58) Field of Search .............................. 360/16, 17, 15

(56) References Cited

U.S. PATENT DOCUMENTS 6,469,848 B1  10/2002  Hamada et al. ............... 360/17

FOREIGN PATENT DOCUMENTS

JP   07078337 A   3/1995
JP   10040544 A   2/1998

*Primary Examiner*—David Hudspeth
*Assistant Examiner*—Natalia Figueroa
(74) *Attorney, Agent, or Firm*—McDermott Will & Emery LLP

(57) ABSTRACT

A master information carrier is made to overlap with a magnetic recording medium being a magnetic recording medium in an adhering state, and a pattern corresponding to information signals on the master information carrier is transferred to the magnetic recording medium, thereby magnetically transferring a magnetized pattern of information signals to the magnetic recording medium. Thereafter, an urging force to the magnetic recording medium side is applied to the master information carrier, and in the urging force applied state, a gas under pressure is supplied on the adhering/joining surfaces of the master information carrier and the magnetic recording medium, thereby releasing the adhering state of the master information carrier and the magnetic recording medium. Then, the application of the urging force is released to continue the supply of the gas under pressure, thereby pulling away the master information carrier from the magnetic recording medium and moving them.

29 Claims, 11 Drawing Sheets

F I G. 10
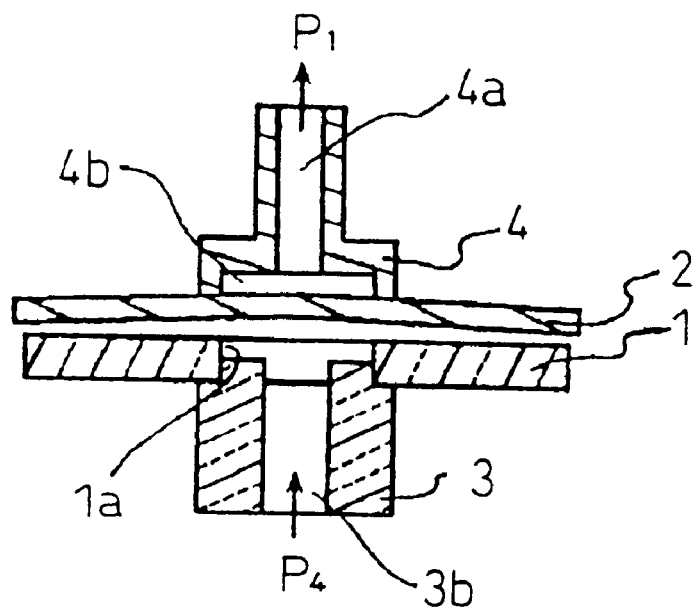

F I G. 15
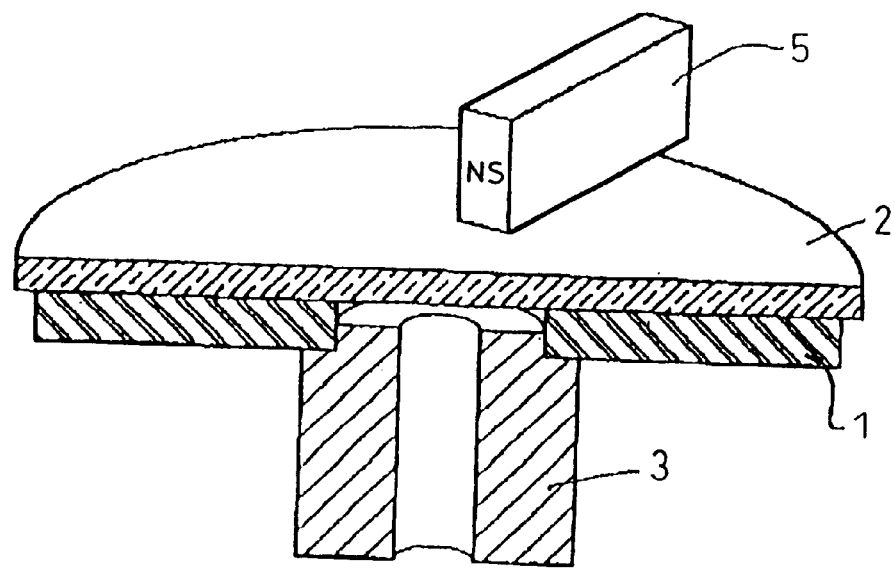
F I G. 16
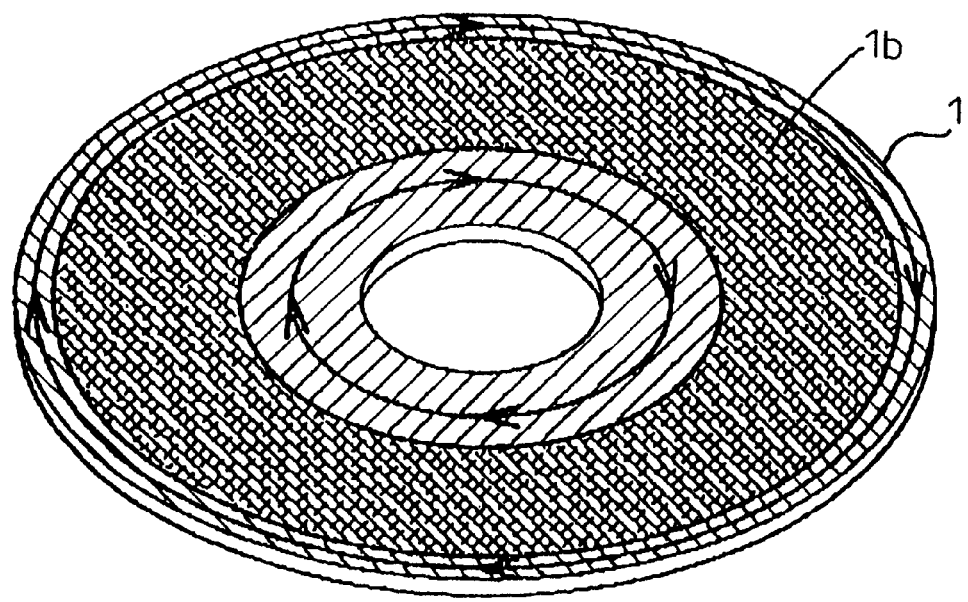

MAGNETIC TRANSFERRING METHOD AND MAGNETIC TRANSFERRING APPARATUS

BACKGROUND OF THE INVENTION

1. Field of the Invention

The present invention relates to a magnetic transferring method of magnetically transferring information signals from a master information carrier to a magnetic recording medium, and to a magnetic transferring apparatus used for the method. The magnetic recording medium includes all media the whole or part of which is magnetically recordable.

2. Description of the Related Art

Currently, hard disc drives and other magnetic recording/reproducing devices tend to achieve a higher storage density in order to realize a smaller size and larger capacity thereof. In such a higher storage density, the tracking servo technology of recording/reproducing magnetic heads plays an important role. In the current tracking servo technology, preformattedly recorded on a magnetic recording medium are information signals such as tracking servo signals, address signals and clock signals. A magnetic head reproduces these information signals and scans correctly the data on the track while checking and correcting the position itself.

These information signals become ones used for a reference in order that a magnetic head scans correctly the data on the track. Therefore, the information signals are required to be correctly positioned and provided with respect to a magnetic recording medium. Thus, a magnetic recording medium is required to have an excellent flatness or smoothness on the recording surface for information signals, and to have no micro-deposits at recording information signals.

As a method of preformattedly recording information signals on a magnetic recording medium, there is a magnetic transferring method in which information signals recorded on a master information carrier are collectively recorded by magnetic transfer on the magnetic recording medium. In such a magnetic transfer, the transfer from the master information carrier to the magnetic recording medium takes place in an adhering state. Thus, after magnetic transfer, it is necessary to separate the master information carrier and the magnetic recording medium which are in a state of adhering to each other.

In such a magnetic transfer, when the master information carrier and the magnetic recording medium have a smooth and flat adhering surface because of a higher storage density, the master information carrier and the magnetic recording medium are in a state of sticking strongly to each other, so that it is not easy to separate the master information carrier from the magnetic recording medium after magnetic transfer.

SUMMARY OF THE INVENTION

Therefore, a primary object of the present invention is to provide a magnetic transferring method capable of separating easily and reliably a master information carrier and a magnetic recording medium which are in a state of adhering to each other for magnetic transfer, after magnetic transfer, and provide a magnetic transferring apparatus used for the method.

Another object of the present invention is to provide a magnetic transferring method capable of separating easily a master information carrier and a magnetic recording medium after magnetic transfer and manufacturing stably and at a good productivity in a short time the magnetic recording medium onto which information signals are magnetically transferred from the master information carrier, and provide a magnetic transferring apparatus used for the method.

Still other objectives, features and advantages of the present invention will be apparent from the following description.

The present invention, when summarized, includes a first step at which a master information carrier is overlapped on a magnetic recording medium in an adhering state, a second step at which in the above-mentioned adhering state, a pattern corresponding to information signals on the above-mentioned master information carrier is magnetically transferred to the above-mentioned magnetic recording medium, a third step at which a urging force of urging the above-mentioned master information carrier and the above-mentioned magnetic recording medium against each other is applied, while a gas under pressure is supplied between both the adhering surfaces of the above-mentioned master information carrier and the above-mentioned magnetic recording medium, and a forth step at which the above-mentioned urging force is released, and the above-mentioned gas under pressure is continued.

The present invention is preferably configured such that in the above-mentioned first step, the above-mentioned master information carrier is made opposite to the above-mentioned magnetic recording medium, and after a gas at a first supplying pressure has been supplied between opposed surfaces of the above-mentioned master information carrier and the above-mentioned magnetic recording medium, the supplying pressure is made to be stopped to cause the above-mentioned master information carrier and the above-mentioned magnetic recording medium to adhere to each other.

The present invention is more preferably configured such that the above-mentioned first supplying pressure is 0.1 through 1 kg/mm$^2$.

The present invention is more preferably configured such that in the above-mentioned first step, the above-mentioned master information carrier is sucked to and held by a sucking pad, and in this holding state, the above-mentioned master information carrier is made to be opposite and close to the above-mentioned magnetic recording medium, and after a gas at a first supplying pressure has been supplied through a central hole of the above-mentioned magnetic recording medium between opposed surfaces of the above-mentioned master information carrier and the above-mentioned magnetic recording medium, the supplying pressure is made to be stopped and at the same time, a gas at the same sucking pressure as that of the above-mentioned sucking pad is sucked from opposed surfaces of the above-mentioned master information carrier and the above-mentioned magnetic recording medium to cause the above-mentioned master information carrier and the above-mentioned magnetic recording medium to adhere to each other.

The present invention is more preferably configured such that in the above-mentioned third step, with the area of the central hole of the above-mentioned magnetic recording medium expressed as S, the urging force against the above-mentioned master information carrier as F, and an pressure of the gas mentioned above pressure for releasing the adhering as $P_4$, there is set a relationship of $F \geq P_4 \times S$.

BRIEF DESCRIPTION OF THE DRAWINGS

These and other objects as well as advantages of the invention will become clear by the following description of preferred embodiments of the invention with reference to the accompanying drawings, wherein:

FIG. 10 is a sectional view of the magnetic transferring apparatus of FIG. 1 in still another magnetic transferring process;

FIG. 15 is a partially broken perspective view showing a state in which information signals are magnetically transferred to the magnetic recording medium by the magnetic transferring apparatus of FIG. 1;

FIG. 16 is a perspective view showing typically a state of a magnetic recording medium on which information signals have been recorded by the process shown in FIG. 15;

DETAILED DESCRIPTION OF PREFERRED EMBODIMENTS

Figure 1:
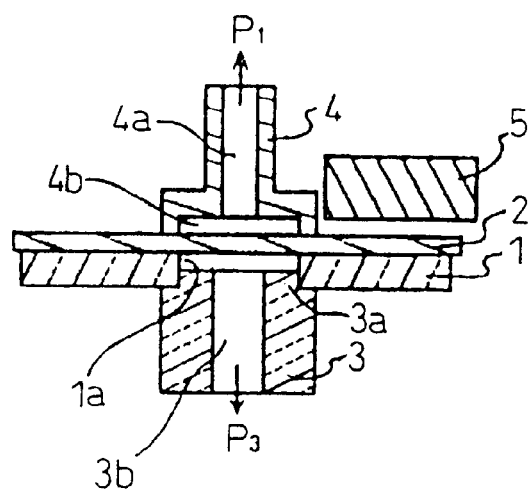
FIG. 1 is a sectional view showing principal members of a magnetic transferring apparatus according to a preferred embodiment of the present invention.

Initially, with reference to FIG. 1, there will be explained a magnetic transferring apparatus according to a preferred embodiment of the present invention. A magnetic recording medium 1 has a central hole 1a penetrating a central region thereof inward/outward and is configured in such a manner that a ferromagnetic thin film made of Co and the like is film-formed on the surface of a doughnut disc-shaped aluminum base plate by a film forming technique such as sputtering technique. In the magnetic recording medium 1, the surface on which the ferromagnetic thin film has been film-formed becomes a magnetic transferred surface to which information signals are magnetically transferred from a master information carrier 2.

The master information carrier 2 has a larger diameter shape than the magnetic recording medium 1, and is arranged by overlapping with the magnetic recording medium 1 so as to be in contact with the magnetic transferred surface thereof. The reason why the master information carrier 2 has a larger diameter than the magnetic recording medium 1 is that where the outer peripheral edge of the master information carrier 2 has been contaminated by being chucked in the manufacturing process, when the master information carrier 2 and the magnetic recording medium 1 are made to be adhered by overlapping with each other, the outer peripheral edge of the master information carrier 2 is caused not to affect on the magnetic transferred surface of the magnetic recording medium 1.

The master information carrier 2 is provided with a signal region formed of a finely arranged pattern-shaped ferromagnetic thin film corresponding to information signals to be magnetically transferred to the magnetic recording medium 1, on the surface of the master information carrier 2 in contact with the magnetic transferred surface of the magnetic recording medium 1. In the master information carrier 2, the surface on which the ferromagnetic thin film has been film-formed becomes a magnetic transferred surface used to magnetically transfer information signals to the information signal transferred surface of the magnetic recording medium 1.

A spindle 3 includes a chuck portion 3a for positioning and holding the magnetic recording medium 1 at the edge portion thereof, as a holding mechanism for holding the magnetic recording medium 1. The spindle 3 has a pressure supplying/sucking hole 3b in communication with a central hole 1a of the magnetic recording medium 1, the pressure supplying/sucking hole 3b being connected through a gas pipe or a duct to a gas pressure supplying/sucking mechanism of a supply/exhaust devices and the like.

Then, when a gas is sucked by the gas pressure supplying/sucking mechanism, there is exhibited a negative pressure state between the opposed surfaces of the magnetic recording medium 1 and the master information carrier 2.

As a result, the master information carrier 2 is sucked toward the magnetic recording medium 1, and the magnetic recording medium 1 is overlapped on the master information carrier 2 in a state in which the former is positioned onto the latter. At this point, there is somewhat a gap between the magnetic recording medium 1 and the master information carrier 2, so that a gas is sucked through the gap from the outside. The kinds of the gas include air, nitrogen gas and others.

A sucking pad 4, as a holding mechanism for holding the master information carrier, sucks a substantially central portion on a side opposite to the magnetic transferring surface of the master information carrier 2, that is, on the back thereof, thereby sucking and holding the master information carrier 2. Hence, the sucking pad 4 has a sucking hole 4a for sucking the master information carrier 2, and is provided with a concave portion 4b in communication with the sucking hole 4a in the top end thereof abutting against the master information carrier 2. The inside diameter of the concave portion 4b of the sucking pad 4 is substantially equal to the diameter of the central hole 1a of the magnetic recording medium 1.

The sucking hole 4a of the sucking pad 4 is attached through a gas pipe or a duct with a gas pressure supplying/sucking mechanism. Starting this gas pressure supplying/sucking mechanism causes the master information carrier 2 to be sucked to the sucking pad 4.

That is, the master information carrier 2 is sucked by the sucking pad 4 to be adsorbed thereto. A sucking pressure $P_1$, at that point is set in such a manner that the pressure in the sucking pad 4 is lower than an external pressure. The magnetic transferring surface of the master information carrier 2 exhibits a state in which due to the sucking pressure $P_1$, the magnetic transferring surface becomes concave inward from the outer peripheral portion toward the central portion, that is, toward the sucking pad 4 side.

For example, where a silicon wafer with about 0.5 mm thickness is used as the master information carrier 2, if the wafer is sucked by the sucking pad 4 at a pressure within a range 0.3 through 1 kg/cm$^2$, then when the master information carrier 2 is sucked by the sucking pad 4, substantially the central portion is held concave toward the sucking pad 4 side.

The reason why the magnetic transferring surface of the master information carrier 2 is made concave as described above is that an enclosed or a substantially enclosed space is formed between the opposed surfaces of the master information carrier 2 and the magnetic recording medium 1, whereby the gas pressure supplying to and gas sucking from the space between the opposed surfaces can be easily performed.

A magnetizing head 5 is used to magnetically transfer information signals from the master information carrier 2 to the magnetic recording medium 1. The magnetic field generated by the magnetizing head 5 causes information signals to be magnetically transferred to the magnetic recording medium 1 in a magnetized pattern corresponding to information signals formed on the master information carrier 2.

The magnetic gap shape of the magnetizing head 5 exhibits the same circular arc as the tracking scan track of the recording/reproducing magnetic head, on the surface opposite to the master information carrier 2. In the magnetizing head 5, the surface opposite to the master information carrier 2 exhibits fan-shape one side of which exhibits the same circular arc as the tracking scan track of the recording/reproducing magnetic head. Therefore, the direction of the magnetic field generating on the magnetic gap of the magnetizing head 5 is always vertical to the tracking scan track. Due to this fact, the ferromagnetic thin film of the master information carrier 2 is magnetized in all tracks in a direction vertical to the tracking scan direction of the recording/reproducing magnetic head, that is, in the same direction as the magnetic gap lengthwise direction of the recording/reproducing magnetic head.

Figure 2:
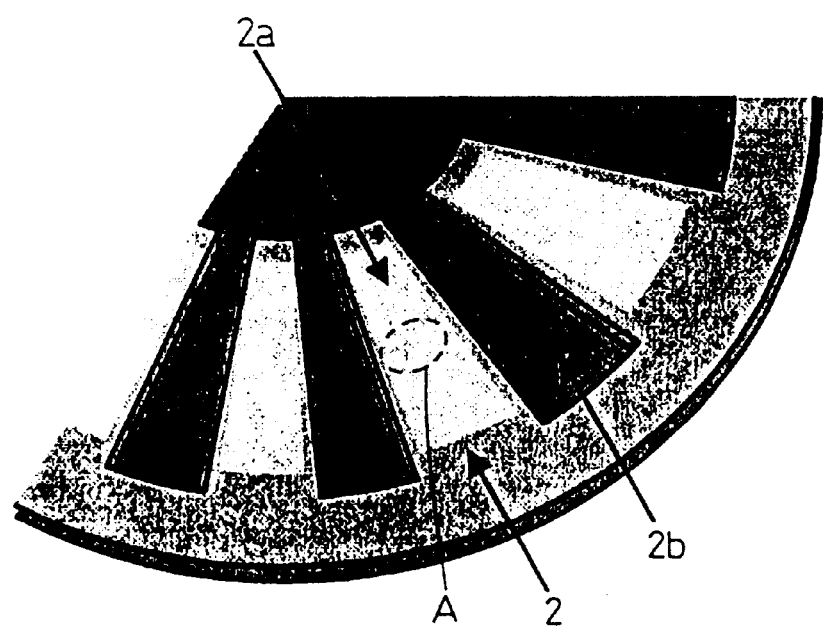
FIG. 2 is a partial plan view of a master information carrier of FIG. 1.

Explaining an example of the master information carrier 2 with reference to FIG. 2, the magnetic transferring surface of the master information carrier 2 is formed with an information signal region 2a substantially radiately. Radiate grooves 2b are formed between the information signal regions 2a and 2a which are away from and adjacent to each other in the peripheral direction.

Figure 3:
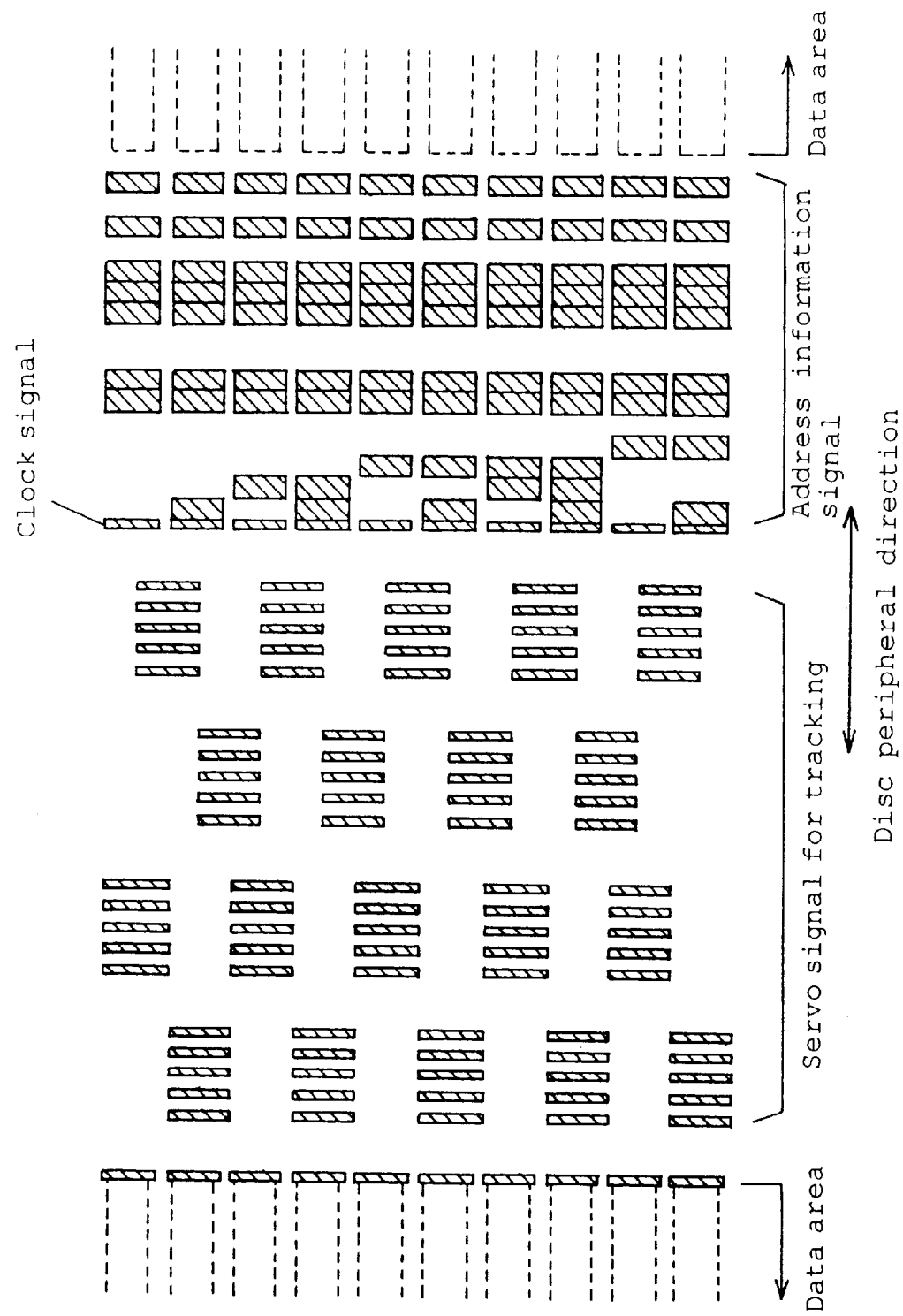
FIG. 3 is a view showing an arrangement pattern of information signals which are magnetically transferred to a magnetic recording medium of FIG. 1.

Referring to FIG. 3 which is an enlarged view of the portion A encircled with dotted line shown in FIG. 2, the information signal region 2a is formed with a master information pattern by a magnetic portion made of the ferromagnetic thin film in a pattern shape corresponding to digital information signals to be recorded on the magnetic recording medium 1 as a magnetic recording medium, in a position corresponding to the above-mentioned information signals, for example, preformatted recording.

Hatched portions in FIG. 3 are the master information pattern configured by the ferromagnetic thin film. This master information pattern is a pattern in which respective regions for clock signals, tracking servo signals, address information signals and the like are sequentially arranged in the track lengthwise direction. This master information pattern is an example, and the configuration and arrangement of the master information pattern will be appropriately determined depending on the digital information signals recorded on a magnetic recording medium.

For example, as for a hard disc drive, where at first, a reference signal is recorded on the ferromagnetic thin film of a magnetic recording medium, and on the basis of the reference signal, preformatted recording of tracking servo signal and the like is performed, using a master information carrier according to the present invention, only the reference signal used for preformatted recording is magnetically transferred previously to the ferromagnetic thin film of a magnetic recording medium. Then, the magnetic recording medium is incorporated in the enclosure of the drive. The preformatted recording of tracking servo signals and the like may be performed by the use of the magnetic head of a magnetic recording medium drive.

Figure 4:
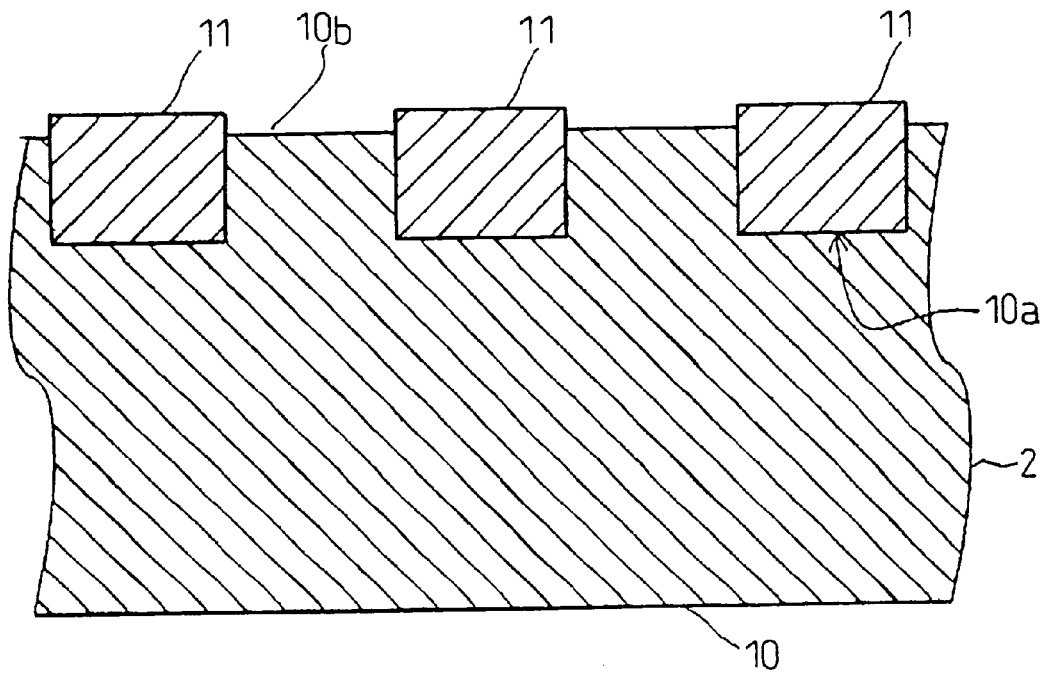
FIG. 4 is an enlarged partially sectional view of the master information carrier of FIG. 1.

Referring to FIG. 4 showing a partial sectional view of the region shown in FIGS. 2 and 3, the master information carrier 2 is configured in such a manner that a concave portion 10a in a plurality of finely arranged pattern shape corresponding to information signals is formed on a main surface of a disc-shaped substrate 10 made of a non-magnetic material such as a silicon wafer substrate, that is, on the surface on a side with which the surface of the magnetic recording medium 1 is in contact, and that a ferromagnetic thin film 11 being a magnetic portion is buried in the concave portion 10a of the substrate 10. 10b designates the surface of the ferromagnetic thin film 11.

Here, as the ferromagnetic thin film 11, regardless of a hard magnetic material, a semi-hard magnetic material and a soft magnetic material, many kinds of magnetic material can be used, so that those capable of magnetically transferring a digital information signal to a magnetic recording medium may be used. For example, Fe, Co, Fe—Co alloy and the like may be used. Without considering the kind of magnetic recording media on which master information is recorded, in order to generate a sufficient magnetic field for magnetic transfer recording, a larger saturated magnetic flux density of the magnetic material is preferable. In particular, for a magnetic disc having a high coercive force exceeding 2000 oersteds and a flexible disc having a thick magnetic layer, no sufficient recording might be achieved when the saturated magnetic flux density becomes 0.8 tesla or less, so that there is used a magnetic material having generally 0.8 tesla or more, preferably 1.0 tesla or more.

Also, it is sufficient that depending on the bit length, the saturated magnetization of a magnetic recording medium, or the film thickness of a magnetic layer thereof, the thickness of the ferromagnetic thin film 11 is about 50 nm through 500 nm, for example, for the bit length of about 1 $\mu$m, the saturated magnetization of a magnetic recording medium of about 500 emu/cc, and the thickness of a magnetic layer of magnetic recording medium of about 20 nm.

Hereinafter, there will be explained a method of manufacturing the master information carrier 2.

That is, a resist film is formed on the surface of a silicon wafer substrate. Then, the resist film is exposed and developed by a lithography technique using laser beams or electronic beams such as the photolithography method to form a pattern. Then, etching is performed by the dry etching and the like to form a finely concave/convex shape corresponding to information signals. Then, a ferromagnetic thin film made of Co and the like is formed by the spattering method, the vacuum evaporation method, the ion plating method, the CVD method, plating method and the like. Then, the resist film is removed by the so-called lift-off method. By these procedures, there is obtained a master information carrier which has a magnetic portion corresponding to information signals and in a form in which the ferromagnetic thin film is buried in the concave portion.

The method of forming a concave/convex shape on the surface of a master information carrier is not limited to the above-mentioned one, and for example, a finely concave/convex shape may be directly formed by the use of laser beams, electronic beams or ion beams, or by machining.

Hereinafter, the summary of the magnetic transferring method of the present invention will be explained.

The present invention is configured such that after the magnetic transfer from the master information carrier 2 to the magnetic recording medium 1 takes place in an adhering state, a gas under pressure is supplied between both the adhering surfaces of the magnetic recording medium 1 and the master information carrier 2 to release the adhering state, whereby the magnetic recording medium 1 and the master information carrier 2 in an adhering state are forcedly separated from each other from the inside.

At this point, since the magnetic recording medium 1 and the master information carrier 2 adhere strongly to each other, only supplying of gas under pressure between both the above-mentioned adhering surfaces allows the adhering not to be released successfully. In a state in which the master information carrier 2 is held by the sucking pad 4, and the magnetic recording medium 1 is held by the spindle 3, they adhere to each other, so that only with a gas under pressure supplied to between the above-mentioned adhering surfaces, a weaker one of the holding force to the master information carrier 2 and the holding force to the magnetic recording medium 1 is previously released by the gas pressure. Thus, with the master information carrier 2 and the magnetic recording medium 1 allowed to urge against to each other by an urging force, a gas under pressure for releasing the adherence is supplied. In other words, both the former and the latter which are desired to be separated are made on the contrary to urge against each other by the urging force.

However, the master information carrier 2 and the magnetic recording medium 1 are not made to urge against each other entirely, but to urge against each other except the place where a gas is caused to flow in between both the adhering surfaces. This allows the master information carrier 2 and the magnetic recording medium 1 not to leave the sucking pad 4 and the spindle 3, respectively, whereby a gas can be supplied between the adhering surfaces to allow both the members to be separated.

Although if the gas flow-in place is an area leading to the adhering surface, routinely, any place is sufficient, the place is preferably the central portion. For normal disc-shaped magnetic recording media including hard discs, the flow-in place is preferably the central hole for chucking.

The urging force applying direction for the sucking pad 4 being a holding mechanism of the master information carrier 2 is normally preferably a direction in which the urging force is applied toward the magnetic recording medium 1, and however, on the contrary, for the spindle 3 being a holding mechanism of the magnetic recording medium 1, the urging force may be applied toward the master information carrier 2, or it does not matter to apply the urging force to each other.

In this way, when the adhering state between the master information carrier 2 and the magnetic recording medium 1 is released, then the urging force is released to cause the master information carrier 2 and the magnetic recording medium 1 to be pulled away from each other to separate.

Hereinafter, the magnetic transferring method of the present invention will be explained.

Figure 5:
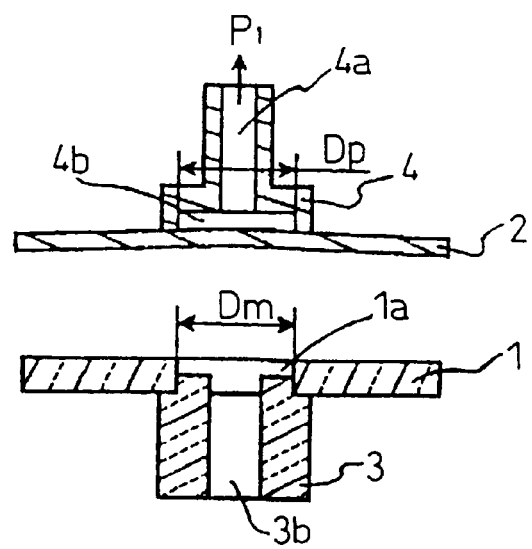
FIG. 5 is a sectional view of the magnetic transferring apparatus of FIG. 1 in a magnetic transferring process.

First, as shown in FIG. 5, the master information carrier 2 is sucked through the concave portion 4b at the top end of the sucking pad 4 at a sucking pressure $P_1$. At this point, the master information carrier 2 is held in a state in which the central portion is concave toward the sucking pad 4 side.

Then, the master information carrier 2 absorbed to the sucking pad 4 is made to be close to the magnetic recording medium 1 attached to the spindle 3.

Here, when as the magnetic recording medium 1, for example, a disc having an inside diameter (Dm) of 25 mm and an outside diameter of 95 mm is used, the outside diameter of the master information carrier 2 is appropriately about 100 mm. Also, the inside diameter at the top end of the sucking pad 4, that is, the inside diameter (Dp) of the concave portion 4b is preferably made equal to the diameter of the central hole 1a of the magnetic recording medium 1. Further, although the present invention can be used for discs having various sized, the outside diameter of the master information carrier 2 used for the method of the present invention is preferably made somewhat larger than the outside diameter of the magnetic recording medium 1.

Figure 6:
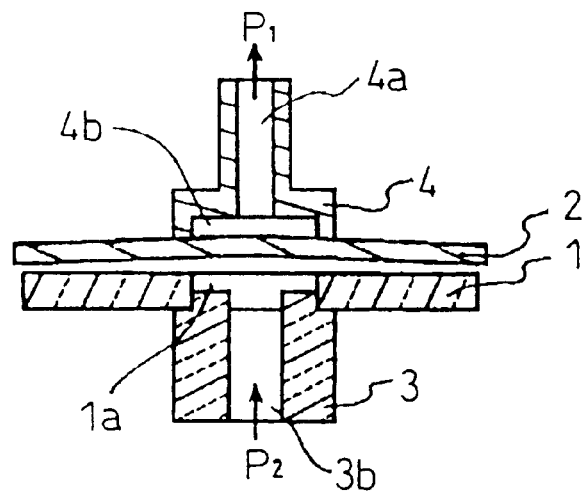
FIG. 6 is a sectional view of the magnetic transferring apparatus of FIG. 1 in another magnetic transferring process.

Then, as shown in FIG. 6, the magnetic recording medium 1 and the master information carrier 2 are made to be close and opposite to each other, and a gas under pressure is supplied through a pressure supplying/sucking hole 3b of the spindle 3 between both the opposed surfaces of the magnetic recording medium 1 and the master information carrier 2. This causes fine dirt and the like deposited on the opposed surfaces of the magnetic recording medium 1 and the master information carrier 2 to be removed, and thus both the opposed surfaces to be cleaned. At this point, a pressure $P_2$ of the gas supplied under pressure is appropriately within a range of 0.3 through 1 $kg/cm^2$.

Although with this process, fine dirt and the like are removed from both the opposed surfaces of the magnetic recording medium 1 and the master information carrier 2, super-fine dirt and the like having a size of 1 $\mu$m or less might not be removed by this processing. Of such super-fine dirt, the one deposited on the magnetic recording medium 1 can be completely removed from the magnetic recording medium 1 by making both the opposed surfaces (one is the magnetic transferring surface, the other is the magnetic transferred surface) of the magnetic recording medium 1 and the master information carrier 2 to adhere to each other in the later process, and then separating the master information carrier 2 and the magnetic recording medium 1 from each other.

Figure 7:
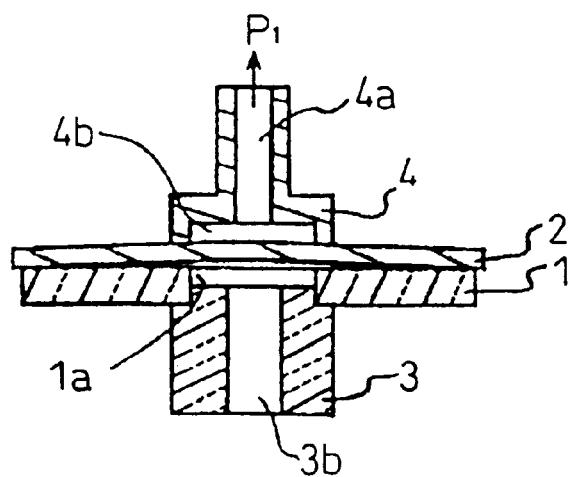
FIG. 7 is a sectional view of the magnetic transferring apparatus of FIG. 1 in still another magnetic transferring process.

After fine dirt is removed in this way, as shown in FIG. 7, the supply of gas under pressure through the pressure supplying/sucking hole 3b of the spindle 3 is made to be stopped to cause the master information carrier 2 and the magnetic recording medium 1 to adhere to each other.

Figure 8:
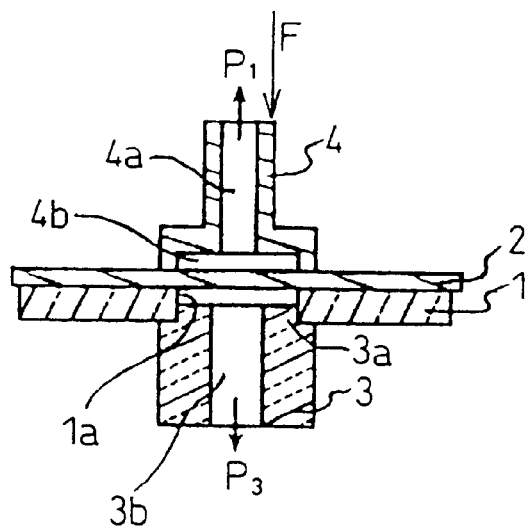
FIG. 8 is a sectional view of the magnetic transferring apparatus of FIG. 1 in still another magnetic transferring process.

Thereafter, as shown in FIG. 8, the central portion of the master information carrier 2 is sucked through the spindle 3 at a sucking pressure $P_3$ at which the concave portion thereof is made flat. At this point, the sucking pressure $P_3$ of the spindle 3 is made equal to the sucking pressure $P_1$ of the sucking pad 4, whereby the master information carrier 2 has no concave portion and exhibits a flat disc-shape to cause the magnetic recording medium 1 and the master information carrier 2 to adhere successfully to each other.

Thereafter, in the above-mentioned adhering state, the transfer magnetic field is applied by the magnetizing head 5 to the master information carrier 2, and the arrangement pattern of information signals thus formed on the master information carrier 2 is magnetically transferred as the magnetized pattern of the information signals to the magnetic recording medium 1.

At a step at which the magnetic transferring is completed, similarly as shown in FIG. 8, an urging force F is applied to the sucking pad 4. The urging force F is applied in a manner to be vertical to the master information carrier 2 and the magnetic recording medium 1 and in a direction in which the master information carrier 2 is pushed against the magnetic recording medium 1.

Figure 9:
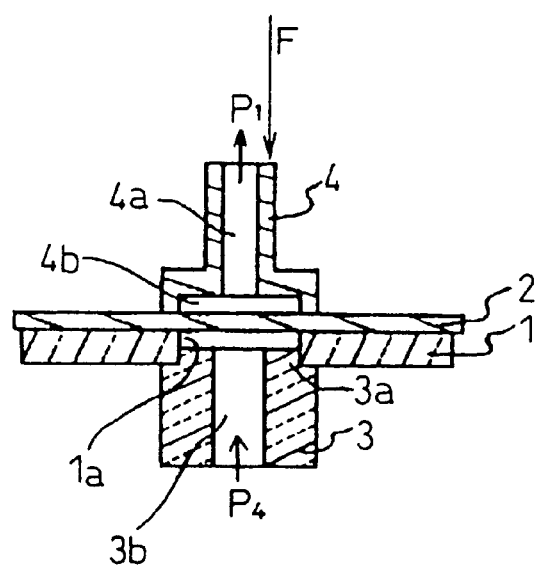
FIG. 9 is a sectional view of the magnetic transferring apparatus of FIG. 1 in still another magnetic transferring process.

Then, in this state, the sucking (at the sucking pressure $P_3$) from the spindle 3 is made to be stopped, and as shown in FIG. 9, a gas at a supply pressure $P_4$ is supplied through the spindle 3 toward between both the adhering surfaces of the master information carrier 2 and the magnetic recording medium 1. When a force that at this moment, the master information carrier 2 receives in a direction in which the master information carrier 2 leaves the spindle 3 is expressed as Fm (not shown), the following expression is obtained:

$$Fm = P_4 \times S$$

where S is the area of the central hole 1a of the magnetic recording medium 1.

If the urging force F=0, that is, no urging force F is applied to the master information carrier 2, then the master information carrier 2 with the magnetic recording medium 1 left stuck thereto leave the spindle 3 being a recording medium holder by the force Fm due to the supply pressure $P_4$. As a result, no gas under pressure can be supplied between the master information carrier 2 and the magnetic recording medium 1, so that it becomes difficult to separate the master information carrier 2 from the magnetic recording medium 1.

According to the present invention, by setting the following relationship:

$$F \geq Fm = P_4 \times S$$

the master information carrier 2 does not float from the spindle 3, so that a gas under pressure is supplied through the groove 2b shown in FIG. 2 between the master information carrier 2 and the magnetic recording medium 1. As a result, a gas flows between the magnetic transferring surface of the master information carrier 2 and the magnetic transferred surface of the magnetic recording medium 1 to cause the adhering to be released.

Then, as shown in FIG. 10, when the urging force F of the sucking pad 4 is removed, the master information carrier 2 and the sucking pad 4 float from the magnetic recording medium 1 by the air pressure $P_4$. The extent of floating is several $\mu$ms through tens of $\mu$ms.

Figure 11:
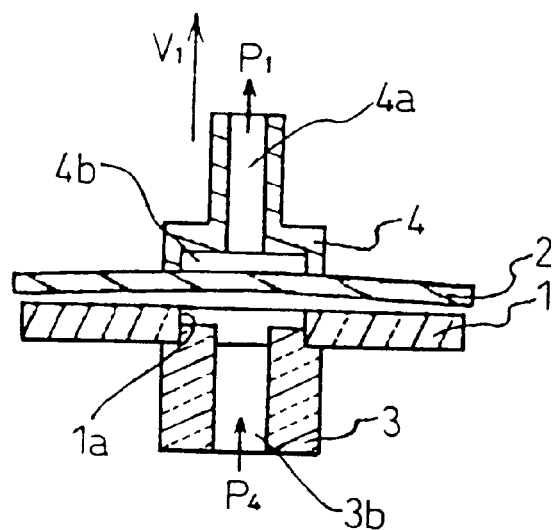
FIG. 11 is a sectional view of the magnetic transferring apparatus of FIG. 1 in still another magnetic transferring process.

Then, as shown in FIG. 11, in order to pull away completely the master information carrier 2 from the magnetic recording medium 1, the sucking pad 4 is made to be away from the magnetic recording medium 1 at a pulling away velocity $V_1$. At this point, when the space increasing ratio between the master information carrier 2 and magnetic recording medium 1 is expressed as Qm, the following expression is obtained:

$$Qm = (\pi \times Do^2 \times V_1)/4$$

where Do is the outside diameter of the magnetic recording medium 1. On the other hand, the quantity per unit time of the gas at the pressure $P_4$ which is supplied to and filled into the space between the master information carrier 2 and the magnetic recording medium 1 is as follows:

$Q = \pi \times Di^4 \times P_4 / (128 \times \mu \times L)$ (Hagen-Poiseuille law) where Di is the diameter of a passage (a passage leading to the pressure supplying/sucking hole 3b, not shown) of the gas supplied to the spindle 3, L is the length of the gas passage, and $\mu$ is the coefficient of viscosity of gas.

If Qm is larger than Q, then the gas filling does not catch up the space increasing, so that a negative pressure develops between the master information carrier 2 and the magnetic recording medium 1. When this state develops, the magnetic recording medium 1 is left stuck to the master information carrier 2, so that the magnetic recording medium 1 is caused to be away from the spindle 3 together with the master information carrier 2.

According to the present invention, by setting the pulling away velocity $V_1$ at the value as shown below:

$$V_1 \leq (P_4 \times Di^4)/(32 \times \mu \times Do^2 \times L)$$

The following is obtained:

$$Qm \leq Q$$

Thus, a sufficient gas filling is performed to cope with the increased space, so that no negative pressure develops in the space between the master information carrier 2 and the magnetic recording medium 1, thereby allowing both the members to be pulled away.

Figure 12:
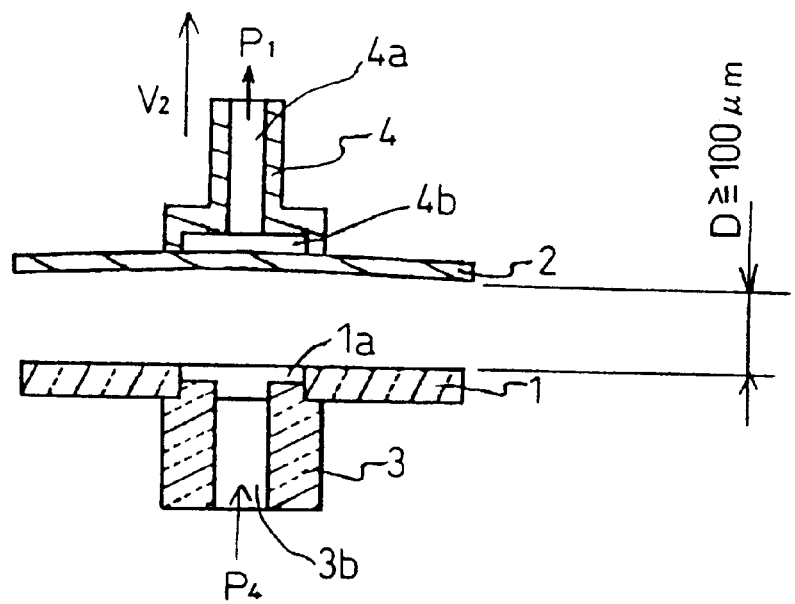
FIG. 12 is a sectional view of the magnetic transferring apparatus of FIG. 1 in still another magnetic transferring process.

Further, according to the present invention, as shown in FIG. 12, at a time when a distance D between the master information carrier 2 and the magnetic recording medium 1 becomes 100 $\mu$m or more, the pulling away velocity of the sucking pad 4 is made changed to $V_2$. Where $V_2$ is assumed to be such a sufficiently large velocity as shown below:

$$V_2 \geq (P_4 \times Di^4)/(32 \times \mu \times Do^2 \times L)$$

When the distance D between the master information carrier 2 and the magnetic recording medium 1 is 100 $\mu$m or more, in addition to the supply of the gas from the spindle 3, a sufficient outside air is supplied from the space on the periphery of the magnetic recording medium 1, so that $V_2$ can be made a sufficiently large velocity without suffering the above-mentioned limit, thereby causing a high-speed transferring and recording operation to be achieved.

Hereinafter, specific examples will be explained.

Using a silicon wafer having an outside diameter of 100 mm and a thickness of 0.525 mm, as the disc-shaped master information carrier 2 having information signals, and using a magnetic recording medium (a 3.5-inch recording medium) having an outside diameter of 95 mm, an inside diameter of 25 mm, and a thickness of 0.8 mm, as the magnetic recording medium 1, the transferring/recording of information from the master information carrier to the magnetic recording medium was performed.

At this point, in FIG. 5, the inside diameter Dp of the concave portion 4b of the sucking pad 4 was also made 25 mm as same as the inside diameter of the slave disc, and the sucking pressure $P_1$ was set at 40 kPa. In FIG. 6, the pressure $P_2$ of the gas supplied to the spindle 3 was set at 10 kPa. Also, $P_3$ in FIG. 1 was set at the same sucking pressure as $P_1$. In FIG. 9, the pressure $P_4$ of the gas supplied to the spindle 3 was set at 5 kPa.

Also, in FIG. 9, the force Fm that the master information carrier 2 receives by the pressure $P_4$ in a direction in which the carrier 2 leaves the spindle 3 is as follows:

$$Fm=P_4\times S=5000\times\pi\times(0.025)^2/4 \approx 2.45\ N\ \text{(N: Newton)}$$

so that the urging force F of the sucking pad 4 was set, as an example, at the following value:

$$F=2.9\ N \geq Fm$$

Also, in FIG. 11, the diameter Di of a pipe line (not shown) through which a gas under pressure is supplied to the pressure supplying/sucking hole 3b of the spindle 3 was set at 4 mm, and the length of the pipe line was set at 1.5 m. Then, the moving velocity $V_1$ of the sucking pad is:

$$V_1 \leq (P_4 \times Di^4)/(32\times\mu\times Do^2 \times L)$$

Substituting an actual value in the above, the following is obtained:

$$V_1 \leq \{5000\times(0.004)^4\}/\{32\times1.81\times10^{-5}\times(0.095)^2\times1.5\} \approx 0.163\ m/s$$

Thus, $V_1$ was set at 0.1 m/s.

Also, in FIG. 12, $V_2$ was set at 0.3 m/s.

The magnetic transfer was applied to the magnetic recording medium by such a procedure, with a result that after transferring, the magnetic recording medium 1 and the master information carrier 2 can have been reliably separated from each other at a high speed.

There will be explained a principle that a transfer magnetic field is applied to the magnetic recording medium 1 by the magnetizing head 5 to cause the information on the master information carrier 2 to be magnetically transferred to the magnetic recording medium 1.

Figure 13:
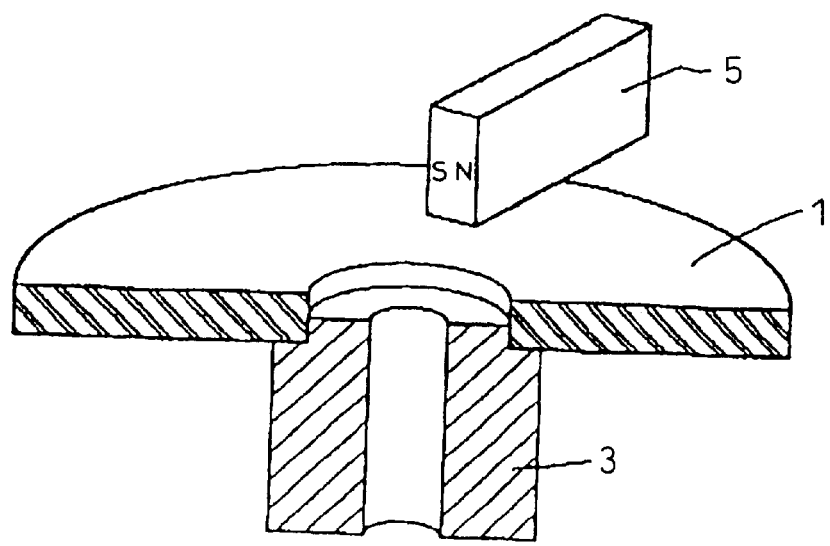
FIG. 13 is a partially broken perspective view showing a state in which a magnetic field is applied to a magnetic recording medium in the magnetic transferring process of the magnetic transferring apparatus of FIG. 1.
Figure 14:
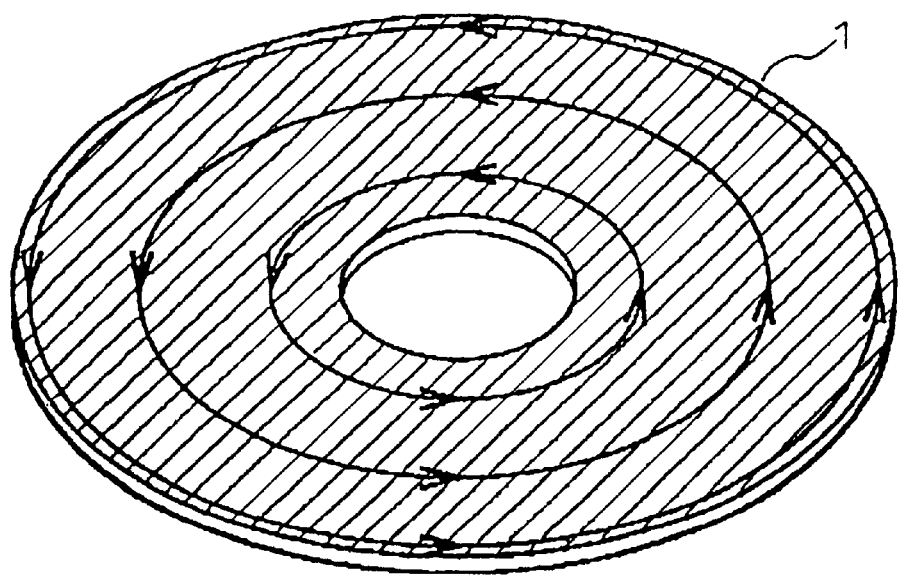
FIG. 14 is a perspective view showing typically a state of a magnetic recording medium which has been magnetized in one direction with the process shown in FIG. 13.

Initially, as shown in FIG. 13, with the magnetizing head 5 made to be close to the magnetic recording medium 1, the magnetizing head 5 is caused to be rotated by the use of the central axis of the magnetic recording medium 1 as a rotational axis in parallel with the magnetic recording medium 1, whereby the magnetic recording medium 1 is previously magnetized in one direction as shown by arrows in FIG. 14 (initial magnetization).

Then, the master information carrier 2 is positioned at the magnetic recording medium 1, and the surface of the master information carrier 2 on which ferromagnetic thin films 11 (see FIG. 17) of the master information carrier 2 are formed is made to overlap with the magnetic recording medium 1 so that the both members adhere evenly to each other. Thereafter, as shown in FIG. 15, the direction of the magnetic field by the magnetizing head 5 is made opposite to the initial magnetization. Also, the magnetizing head 5 is made to be rotated by the use of the center of the magnetic recording medium 1 held by the spindle 3 as a rotational center in parallel with the master information carrier 2. This causes a direct-current exciting magnetic field to be applied to the master information carrier 2.

This causes the ferromagnetic thin films 11 of the master information carrier 2 to be magnetized, and thus information signals corresponding to the pattern shape of the magnetic portion of the ferromagnetic thin films 11 as shown in FIG. 16 are recorded on a predetermined region 1b of the magnetic recording medium 1 overlapped on the master information carrier 2. The arrows shown in FIG. 16 indicate the directions of the magnetic field of the magnetized pattern magnetically transferred to the magnetic recording medium 1 at this point.

Figure 17:
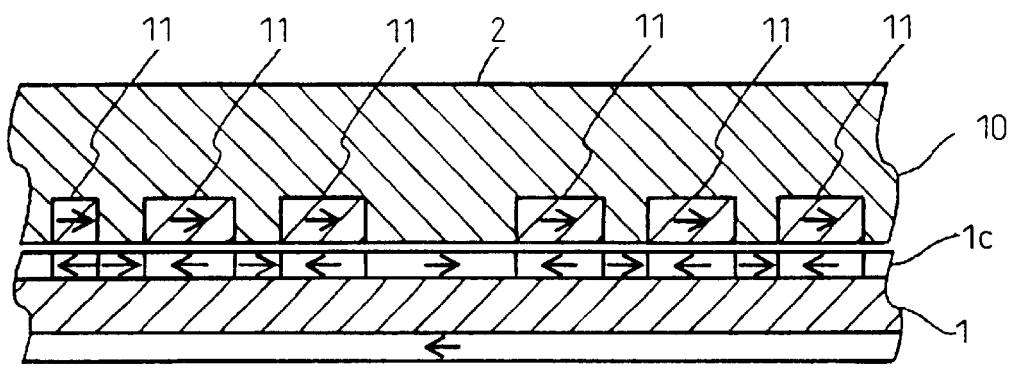
FIG. 17 is a sectional view to help explain a state of a magnetized pattern when information signals have been magnetically transferred to a magnetic recording medium by the process shown in FIG. 15.

FIG. 17 shows a state in which the magnetizing processing has been made. As shown in FIG. 17, with the master information carrier 2 having adhered to the magnetic recording medium 1 being a magnetic recording medium, the magnetic field is externally applied to the master information carrier 2 to cause the ferromagnetic thin films 11 to be magnetized, whereby information signals can be magnetically transferred to a magnetic recording layer 1c formed of ferromagnetic thin films of the magnetic recording medium 1. That is, by the use of the master information carrier 2 configured in a manner to form the ferromagnetic thin films 11 on the non-magnetic substrate 10 in a predetermined arrangement pattern shape, digital information signals can be magnetically transferred to the magnetic recording medium 1 being a magnetic recording medium.

As a method when the pattern of the master information carrier 2 is magnetically transferred to the magnetic recording medium 1, other than the method of applying an external magnetic field with the master information carrier 2 made to be contacted with the magnetic recording medium 1 as described above, there is another method of contacting the master information carrier 2 with the magnetic recording medium 1 in a manner to adhere to each other, in a state in which the ferromagnetic thin films 11 of the master information carrier 2 have been previously magnetized. Even with the other method, digital information signals can be magnetically transferred.

Figure 18:
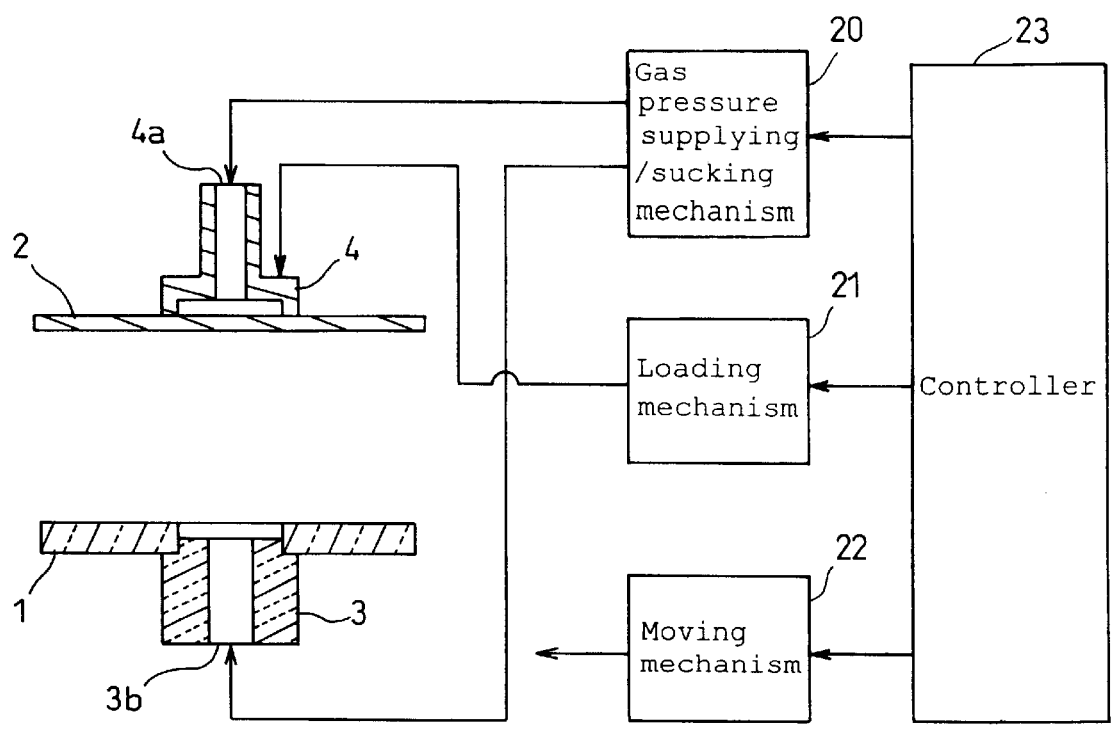
FIG. 18 is a composition view of a magnetic transferring apparatus according to another preferred embodiment of the present invention.

The above-mentioned magnetic transferring apparatus including a controller will be explained with reference to FIGS. 18 and 19.

The magnetic transferring apparatus has the above-mentioned spindle 3, sucking pad 4 and magnetizing head 5, as well as a gas pressure supplying/sucking mechanism 20, a loading mechanism 21, a moving mechanism 22 and a controller 23.

The spindle 3 can be called a holding mechanism for holding the magnetic recording medium 1, and the sucking pad 4 can be called a holding mechanism for holding the master information carrier 2. What includes the spindle 3, the sucking pad 4 and the moving mechanism 22 can be called a holding/adhering mechanism.

The gas pressure supplying/sucking mechanism 20 consist of, for example, an electromagnetic pump, and is connected through a gas pipe or a duct to the pressure supplying/sucking hole 3b of the spindle 3 and to the shucking hole 4a of the sucking pad 4, and responds to a control signal from the controller 23 to supply a gas under pressure to and suck therefrom.

The loading mechanism 21 applies the urging force F through the sucking pad 4 to the master information carrier 2.

The moving mechanism 22 performs movements in such a manner to make the master information carrier 2 close with and pull away from the magnetic recording medium 1. In this case, the pulling away operation can be performed by switching of the velocity to $V_1$ or $V_2$.

Figure 19:
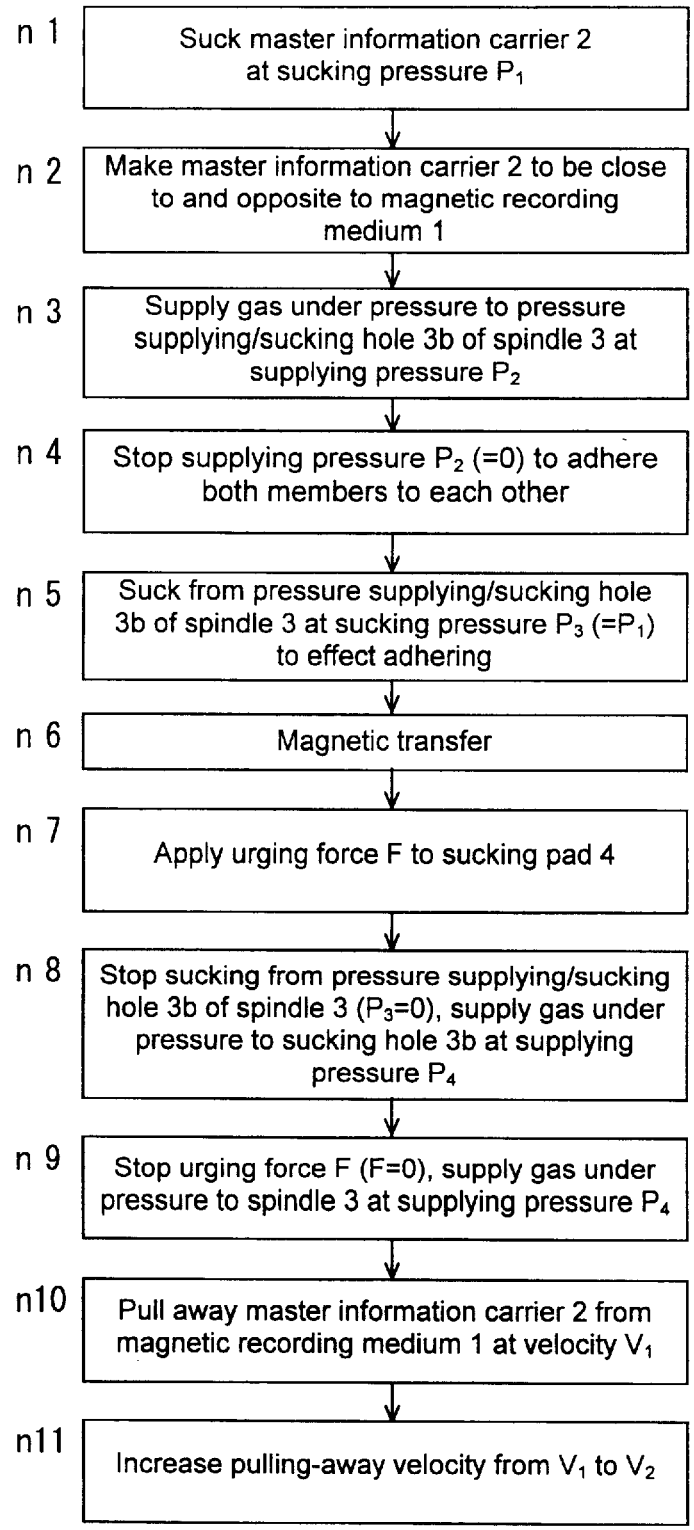
FIG. 19 is an operational flowchart of a controller of FIG. 18.

For the above-mentioned magnetic transfer, the controller 23 performs a control according to a flowchart of FIG. 19 for the magnetizing head 5, the gas pressure supplying/sucking mechanism 20, the loading mechanism 21, and the moving mechanism 22.

(Step n1)

First, the gas pressure supplying/sucking mechanism 20 is drivingly controlled to suck a gas at the sucking pressure $P_1$ though the sucking hole 4a of the sucking pad 4. The sucking pressure $P_1$ is applied at all following steps.

(Step n2)

Then, the moving mechanism 22 is drivingly controlled to make the master information carrier 2 to be close and opposite to the magnetic recording medium 1.

(Step n3)

Subsequently, the gas pressure supplying/sucking mechanism 20 is drivingly controlled to supply a gas under pressure at the supplying pressure $P_2$ through the pressure supplying/sucking hole 3b of the spindle 3.

(Step n4)

Then, the gas pressure supplying/sucking mechanism 20 is drivingly controlled to stop (the supplying pressure $P_2=0$) the pressure supplying of the gas through the pressure supplying/sucking hole 3b of the spindle 3, thereby making the master information carrier 2 and the magnetic recording medium 1 adhere to each other.

(Step n5)

Then, the gas pressure supplying/sucking mechanism 20 is drivingly controlled to suck the gas at the sucking pressure $P_3$ from the pressure supplying/sucking hole 3b of the spindle 3. At this point, the sucking pressure $P_3$ is made equal to the sucking pressure $P_1$ of the sucking pad 4. The magnetic recording medium 1 and the master information carrier 2 are made a successful adhering state.

(Step n6)

Then, in a pressure state at the above-mentioned step n5, with the magnetic recording medium 1 and the master information carrier 2 adhering to each other, the magnetizing head 5 is drivingly controlled to apply the transfer magnetic field, thereby transferring/recording the arrangement pattern of information signals formed on the master information carrier 2 to the magnetic recording medium 1 as a magnetizing pattern of information signals.

(Step n7)

Then, at the step of the completion of transferring/recording, the loading mechanism 21 is drivingly controlled to apply the urging force F to the sucking pad 4.

(Step n8)

In this state, the gas pressure supplying/sucking mechanism 20 is drivingly controlled to stop (the sucking pressure $P_3=0$) the sucking of the gas in the spindle 3, and the gas pressure supplying/sucking mechanism 20 is drivingly controlled to supply a gas under pressure at the supplying pressure $P_4$ through the spindle 3.

(Step n9)

Then, the loading mechanism 21 is drivingly controlled to remove the urging force F against the sucking pad 4, thereby causing the master information carrier 2 to be floated from the magnetic recording medium 1 by the supplying pressure $P_4$ from the sucking hole 3b of the spindle 3.

(Step n10)

Then, the moving mechanism 22 is drivingly controlled to move the sucking pad 4 further away at the pulling-away velocity $V_1$ so as to completely pull away the master information carrier 2 from the magnetic recording medium 1.

(Step n11)

Then, at a time when the distance D between the master information carrier 2 and the magnetic recording medium 1 becomes 100 μm or more, the moving mechanism 22 is drivingly controlled to change the pulling-away velocity of the sucking pad 4 to $V_2$.

The control by the controller 23 as described above allows the master information carrier 2 and the magnetic recording medium 1 which adhere to each other for the magnetic transfer to be separated easily and reliably after the magnetic transfer. The controller 23 contains a microcomputer and can control the above-mentioned magnetic transfer by the software processing executing the flowchart of FIG. 19 in the microcomputer.

The controller 23 configured by the microcomputer is adapted to store arithmetic expressions such as $P_1$ through $P_4$, $F \geq Fm = P_4 \times S$, $Qm=(\pi \times Do^2 \times V_1)/4$, $Q=\pi \times Di^4 \times P_4/(128 \times \mu \times L)$, $Qm \leq Q$ and $V_2 \geq (P_4 \times Di^4)/(32 \times \mu \times Do^2 \times L)$, and the numerical data required for operation on the basis of these arithmetic expressions on program memory to execute the above-mentioned software, and on data memory, thereby executing the above-mentioned steps in the CPU according to these numerical data and arithmetic expressions.

The gas pressure supplying/sucking mechanism 20, the loading mechanism 21, the moving mechanism 22 and the controller 23 may be made a unit configuration. Also, there may be provided a sensor for detecting the gas pressure, the load, or the moving distance, and the sensor output may be made to feedback to the controller 23, and the controller 23 may achieve the execution of respective steps from the sensor output.

While there has been described what is at present considered to be preferred embodiments of this invention, it will be understood that various modifications may be made therein, and it is understood to cover in the appended claims all such modifications as fall within the true spirit and scope of this invention.

What is claimed is:

1. A magnetic transferring method comprising:
    a first step at which a master information carrier is made to overlap with a magnetic recording medium in an adhering state,
    a second step at which in said adhering state at said first step, a pattern corresponding to information signals on said master information carrier is magnetically transferred to said magnetic recording medium,
    a third step at which an urging force is applied in a direction in which said master information carrier and said magnetic recording medium urge against each other, while a gas under pressure is supplied between both the adhering surfaces of said master information carrier and said magnetic recording medium, and
    a fourth step at which said urging force at said third step is released to continue the supply of said gas under pressure.

2. The magnetic transferring method as set forth in claim 1, wherein at said first step, said master information carrier is made to be opposite to said magnetic recording medium, and a gas at a first supplying pressure is supplied between both the opposite surfaces of said master information carrier and said magnetic recording medium, and then the pressure supplying is stopped to cause said master information carrier and said magnetic recording medium to adhere to each other.

3. The magnetic transferring method as set forth in claim 2, wherein at said first step, said first supplying pressure is 0.1 through 1 kg/mm².

4. The magnetic transferring method as set forth in claim 1, wherein at said first step, said master information carrier is sucked to and held at the sucking pad, and in this holding state, said master information carrier is made to be opposite to and close to said magnetic recording medium, and a gas at a first supplying pressure is supplied through a central hole of said magnetic recording medium between both the opposite surfaces of said master information carrier and said magnetic recording medium, and then the pressure supplying is stopped and at the same time, a gas at the same sucking pressure as that of said sucking pad is sucked between both the opposite surfaces of said master information carrier and said magnetic recording medium, thereby causing said master information carrier and said magnetic recording medium to adhere to each other.

5. The magnetic transferring method as set forth in claim 1, wherein at said third step, with an area of the central hole of said magnetic recording medium expressed as S, an urging force against said master information carrier as F, and an pressure of said gas for releasing adhering as $P_4$, said urging force is set at a relationship $F \geq P_4 \times S$.

6. The magnetic transferring method as set forth in claim 1, wherein after said fourth step, there is included a fifth step at which said master information carrier is pulled away at a predetermined pulling-away velocity from said magnetic recording medium, at which fifth step, with said velocity expressed as $V_1$, the outside diameter of said magnetic recording medium as Do, the diameter of the passage of said gas as Di, the length of said passage as L, and the coefficient of viscosity of the gas as $\mu$, the pulling-away velocity is set at a relationship $V_1 \leq (P_4 \times Di^4)/(32 \times \mu \times Do^2 \times L)$.

7. The magnetic transferring method as set forth in claim 6, wherein at the pulling away of said master information carrier from said magnetic recording medium, when the clearance between said master information carrier and said magnetic recording medium exceeds a predetermined value, said velocity $V_1$ is made to increase to a pulling-away velocity $V_2$, the increased pulling-away velocity $V_2$ is set at a relationship $V_2 \geq (P_4 \times Di^4)/(32 \times \mu \times Do^2 \times L)$.

8. The magnetic transferring method as set forth in claim 1, wherein said master information carrier is of disc-shape, said magnetic recording medium is a disc-shaped magnetic disc, and said master information carrier is larger in diameter than said magnetic recording medium.

9. A magnetic transferring method comprising:
   a first step at which with a master information carrier made to be opposite to a magnetic recording medium, a gas at a first supplying pressure is supplied through the central hole of said magnetic recording medium between both the opposite surfaces of said master information carrier and said magnetic recording medium,
   a second step at which the pressure supplying at said first step is stopped to cause said master information carrier and said magnetic recording medium to adhere to each other,
   a third step at which in said adhering state at said second step, a pattern corresponding to information signals on said master information carrier is magnetically transferred to said magnetic recording medium,
   a fourth step at which an urging force is applied in a direction in which said master information carrier and said magnetic recording medium urge against each other, while a gas at a second supplying pressure is supplied through the central hole of said magnetic recording medium between both the adhering surfaces of said master information carrier and said magnetic recording medium, and
   a fifth step at which said urging force at said fourth step is released to continue the pressure supplying of the gas at said fourth step.

10. The magnetic transferring method as set forth in claim 9, wherein at said first step, the back of said master information carrier is sucked at a first sucking pressure by a sucking pad to hold said master information carrier at said sucking pad, and in this sucking/holding state, said master information carrier is made to be opposite to and close to said magnetic recording medium, and in this opposite state, a gas under pressure is supplied through the central hole of said magnetic recording medium between both the opposite surfaces of said master information carrier and said magnetic recording medium.

11. The magnetic transferring method as set forth in claim 9, wherein at said second step, the pressure supplying of said gas to the central hole of said magnetic recording medium is stopped and at the same time, a gas at the same sucking pressure as said first sucking pressure is sucked through the central hole of said magnetic recording medium between both the opposite surfaces of said master information carrier and said magnetic recording medium, thereby causing said master information carrier and said magnetic recording medium to adhere to each other.

12. The magnetic transferring method as set forth in claim 9, wherein at said fourth step, with an area of the central hole of said magnetic recording medium expressed as S, an urging force against said master information carrier as F, and an pressure of said gas for releasing adhering as $P_4$, said urging force is set at a relationship $F \geq P_4 \times S$.

13. A magnetic transferring method comprising:
   a first step at which a master information carrier is sucked to and held at a first sucking pressure by the sucking pad,
   a second step at which in said sucking/holding state at said first step, said master information carrier is made to be opposite to and close to a magnetic recording medium,
   a third step at which in said opposite state at said second step, a gas under pressure is supplied through a central hole of said magnetic recording medium between both the opposite surfaces of said master information carrier and said magnetic recording medium,
   a fourth step at which said pressure supplying of the gas at said third step is stopped and at the same time, a gas at a second sucking pressure is sucked through a pressure supplying/sucking hole of a spindle between both the opposite surfaces of said master information carrier and said magnetic recording medium, thereby causing said master information carrier and said magnetic recording medium to adhere to each other,
   a fifth step at which in said adhering state at said fourth step, a pattern corresponding to information signals on said master information carrier is magnetically transferred to said magnetic recording medium,
   a sixth step at which an urging force is applied in a direction in which the force urges against said master information carrier and said magnetic recording medium which are in said adhering state at said steps 4 and 5, while a gas under pressure is supplied between both the adhering surfaces of said master information carrier and said magnetic recording medium, and
   a seventh step at which said urging force at said sixth step is released to continue the pressure supplying of said gas.

14. The magnetic transferring method as set forth in claim 13, wherein said first sucking pressure at said first step is set at a value at which the magnetic transferring surface of said master information carrier is caused to become concave, while said second sucking pressure at said fourth step is set at the same value as said first sucking pressure.

15. The magnetic transferring method as set forth in claim 13, wherein at said sixth step, with an area of the central hole of said magnetic recording medium expressed as S, an urging force against said master information carrier as F, and an pressure of said gas for releasing adhering as $P_4$, said urging force is set at a relationship $F \geq P_4 \times S$.

16. The magnetic transferring method as set forth in claim 13, wherein after said seventh step, there is included an eighth step at which said master information carrier is pulled away from said magnetic recording medium, at which eighth step, with said first pulling-away velocity of said master information carrier from said magnetic recording medium expressed as $V_1$, the outside diameter of said magnetic recording medium as Do, the diameter of the passage of said gas as Di, the length of said passage as L, and the coefficient of viscosity of the gas as $\mu$, the pulling-away velocity is set at a relationship $V_1 \leq (P_4 \times Di^4)/(32 \times \mu \times Do^2 \times L)$.

17. The magnetic transferring method as set forth in claim 16, wherein at said eighth step, when the pulling-away distance between said master information carrier and said magnetic recording medium exceeds a predetermined value, said pulling-away velocity is made to increase from a first velocity $V_1$ to a second velocity $V_2$.

18. The magnetic transferring method as set forth in claim 17, wherein said second velocity $V_2$ is set at a relationship $V_2 \geq (P_4 \times Di^4)/(32 \times \mu \times Do^2 \times L)$.

19. The magnetic transferring method as set forth in claim 18, wherein when said first velocity $V_1$ is switched to said second velocity $V_2$, the separated distance between said master information carrier and said magnetic recording medium is set at 100 $\mu$m or more.

20. The magnetic transferring method as set forth in claim 13, characterized in that as said master information carrier, there is used a master information carrier in which a magnetic portion made of ferromagnetic thin films is formed on a disc-shaped substrate in a manner to exhibit an arrangement pattern corresponding to predetermined information signals, and the master information carrier is overlapped on said magnetic recording medium in an adhering state, and said magnetic portion of said master information carrier is magnetized, whereby the arrangement pattern of information signals formed on said master information carrier as a magnetized pattern is transferred to and recorded on said magnetic recording medium.

21. A magnetic transferring apparatus comprising:
a gas pressure supplying/sucking mechanism for supplying a gas under pressure to and sucking from the opposite surfaces of a master information carrier and a magnetic recording medium,
a loading mechanism for applying an urging force in a direction in which said master information carrier and said magnetic recording medium urge against each other, and
a controller for drivingly controlling said gas pressure supplying/sucking mechanism and said loading mechanism,
wherein said controller executes a first step at which with said master information carrier and said magnetic recording medium adhering to each other, said loading mechanism is drivingly controlled to perform said magnetic transfer, and then an urging force is applied in a direction in which said master information carrier and said magnetic recording medium urge against each other, a second step at which said gas pressure supplying/sucking mechanism is drivingly controlled to supply a gas under pressure between both the adhering surfaces of said master information carrier and said magnetic recording medium, and a third step at which said loading mechanism is drivingly controlled to release said urging force, and said gas pressure supplying/sucking mechanism is drivingly controlled to continue the pressure supplying of said gas.

22. The magnetic transferring apparatus as set forth in claim 21, wherein at said first and second steps, said controller drivingly controls said loading mechanism and said gas pressure supplying/sucking mechanism under a relationship $F \geq P_4 \times S$ when said urging force is expressed as F, an pressure of said gas as $P_4$, and an area of the central hole of said magnetic recording medium as S.

23. A magnetic transferring apparatus comprising:
a holding/adhering mechanism for holding a master information carrier and a magnetic recording medium and adhering them to each other,
a gas pressure supplying/sucking mechanism for supplying a gas under pressure to and sucking from the opposite surfaces of said master information carrier and said magnetic recording medium,
a loading mechanism for applying an urging force in a direction in which said master information carrier and said magnetic recording medium urge against each other,
a magnetizing head for magnetically transferring information signals from said master information carrier to said magnetic recording medium, and
a controller for drivingly control said gas pressure supplying/sucking mechanism, said loading mechanism and said magnetizing head,
wherein said controller executes a first step at which said holding/adhering mechanism is drivingly controlled to make said master information carrier and said magnetic recording medium adhere to each other, a second step at which in the adhering state, said magnetizing head is drivingly controlled to magnetically transfer a pattern corresponding to information signals on said master information carrier to said magnetic recording medium, a third step at which said loading mechanism is drivingly controlled to perform said magnetic transfer, and then an urging force is applied in a direction in which said master information carrier and said magnetic recording medium urge against each other, a fourth step at which said gas pressure supplying/sucking mechanism is drivingly controlled to supply a gas under pressure between both the opposite surfaces of said master information carrier and said magnetic recording medium, and a fifth step at which said loading mechanism is drivingly controlled to release said urging force, and said gas pressure supplying/sucking mechanism is drivingly controlled to continue the pressure supplying of said gas.

24. The magnetic transferring apparatus as set forth in claim 23, wherein:
said holding/adhering mechanism includes a spindle having a gas pressure supplying/sucking hole, and said spindle holds the magnetic recording medium at the back surface side thereof with the gas pressure supplying/sucking hole in communication with a central hole of said magnetic recording medium,
said gas pressure supplying/sucking mechanism is made possible to supply under pressure and suck a gas through the gas pressure supplying/sucking hole of said spindle and the central hole of said magnetic recording medium between both the opposite surfaces of said master information carrier and said magnetic recording medium, and
said controller drivingly controls said gas pressure supplying/sucking mechanism to execute said steps.

25. The magnetic transferring apparatus as set forth in claim 23, wherein:

said holding/adhering mechanism includes a sucking pad which has a gas sucking hole and sucks the back surface side of said master information carrier to hold the master information carrier, said gas pressure supplying/sucking mechanism is made possible to suck said gas through the sucking hole of said sucking pad, and said controller drivingly controls said gas pressure supplying/sucking mechanism to suck and hold said master information carrier at a first sucking pressure to said sucking pad, and drivingly controls said loading mechanism to make said master information carrier and said magnetic recording medium close to and opposite to each other, and then, drivingly controls said gas pressure supplying/sucking mechanism to supply a gas under pressure from the gas pressure supplying/sucking hole of said spindle, and thereafter, to suck the gas from the gas pressure supplying/sucking hole of said spindle at the same second sucking pressure as said first sucking pressure.

26. The magnetic transferring apparatus as set forth in claim 23, wherein at said third and fourth steps, said controller drivingly controls said loading mechanism and said gas pressure supplying/sucking mechanism under a relationship $F \geqq P_4 \times S$ when said urging force is expressed as F, an pressure of said gas as $P_4$, and an area of the central hole of said magnetic recording medium as S.

27. The magnetic transferring apparatus as set forth in claim 26, wherein said sucking pad has at the top end thereof a concave portion with the same inside diameter as the central hole of said magnetic recording medium.

28. The magnetic transferring apparatus as set forth in claim 23, wherein after the fifth step, said controller executes a sixth step at which with the pulling-away velocity of said master information carrier from said magnetic recording medium expressed as $V_1$, the outside diameter of said magnetic recording medium as Do, the diameter of the passage of said gas as Di, the length of said passage as L, and the coefficient of viscosity of the gas as $\mu$, the pulling-away velocity is set at a relationship $V_1 \leqq (P_4 \times Di^4)/(32 \times \mu \times Do^2 \times L)$, whereby the master information carrier and the magnetic recording medium are pulled away from each other.

29. The magnetic transferring apparatus as set forth in claim 28, wherein at the pulling-away of said master information carrier from said magnetic recording medium, said controller, when the clearance between said master information carrier and said magnetic recording medium exceeds a predetermined value, increase said velocity $V_1$ to a pulling-away velocity $V_2$, and sets the increased pulling-away velocity $V_2$ at a relationship $V_2 \geqq (P_4 \times Di^4)/(32 \times \mu \times Do^2 \times L)$.

* * * * *